G. F. RAYNER.
MOTOR CYCLE, TRICAR, CYCLE CAR, AND LIKE MOTOR VEHICLE.
APPLICATION FILED JAN. 16, 1914.
1,170,845.
Patented Feb. 8, 1916.
2 SHEETS—SHEET 1.
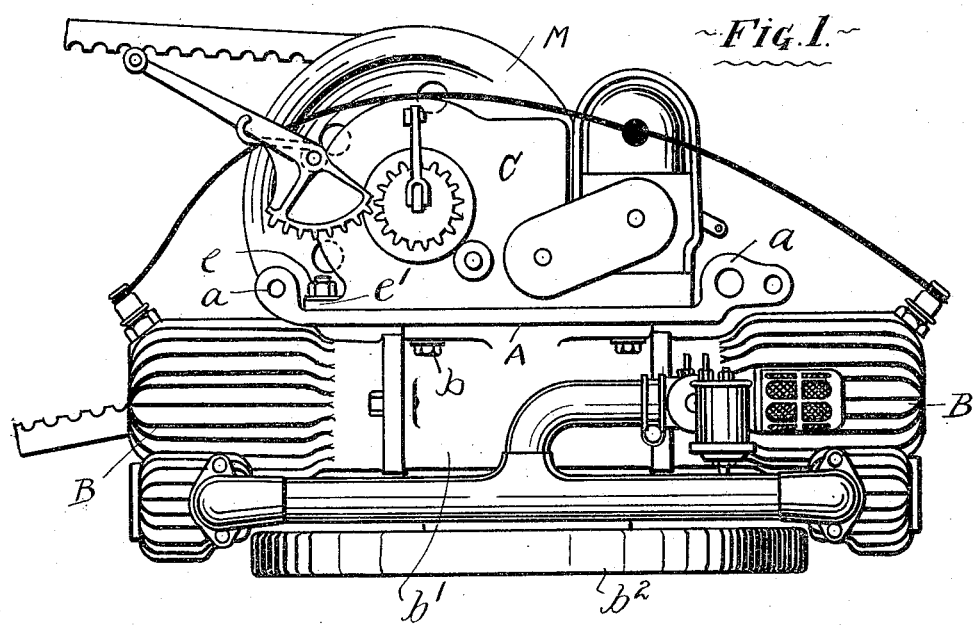
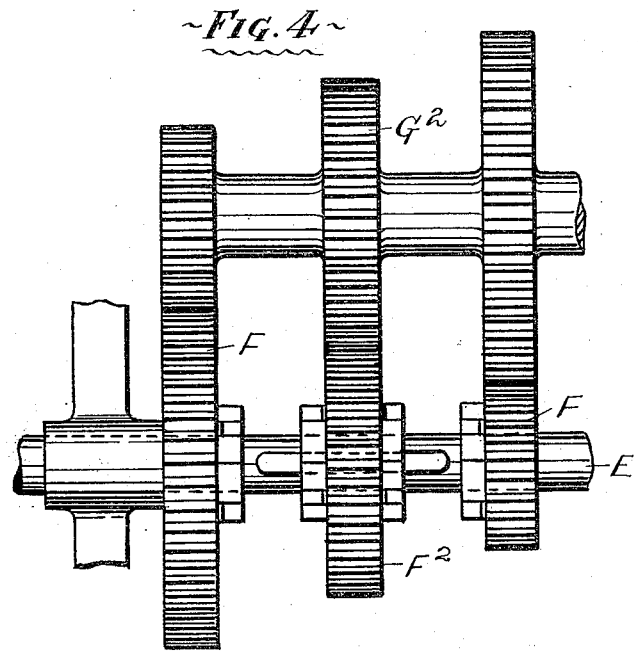
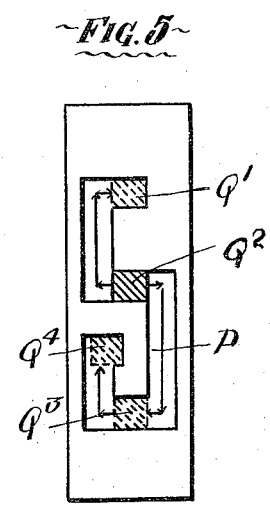

G. F. RAYNER.
MOTOR CYCLE, TRICAR, CYCLE CAR, AND LIKE MOTOR VEHICLE.
APPLICATION FILED JAN. 16, 1914.
1,170,845.
Patented Feb. 8, 1916.
2 SHEETS—SHEET 2.
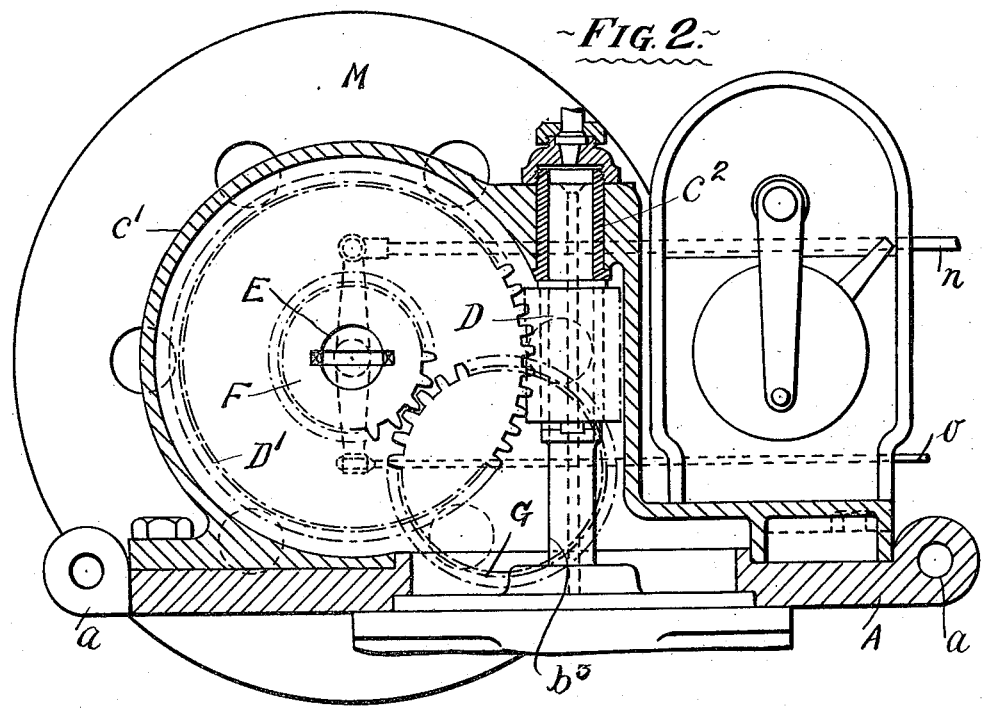
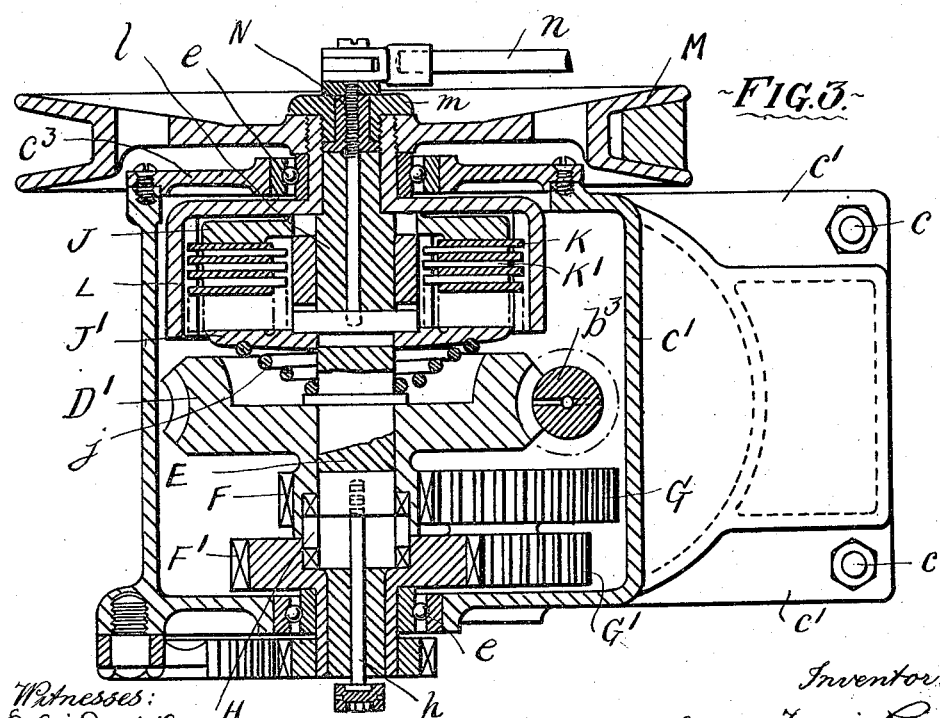

UNITED STATES PATENT OFFICE.

GEORGE F. RAYNER, OF ACTON, ENGLAND.

MOTOR-CYCLE, TRICAR, CYCLE-CAR, AND LIKE MOTOR-VEHICLE.

1,170,845. Specification of Letters Patent. Patented Feb. 8, 1916.

Application filed January 16, 1914. Serial No. 812,510.

*To all whom it may concern:*

Be it known that I, GEORGE FREDRIC RAYNER, subject of the King of Great Britain and Ireland, residing at 36 Chatsworth Gardens, Acton, in the county of Middlesex, England, have invented new and useful Improvements in Motor-Cycles, Tricars, Cycle-Cars, and like Motor-Vehicles, of which the following is a specification.

This invention relates to improvements in motor cycles, tricars, cycle cars and like motor vehicles and consists of a novel method of mounting and transmitting the power from a horizontal engine having its crank-shaft disposed vertically.

According to my invention the engine which is preferably of the double opposed type, but which may be of the fixed radial cylinder or rotating cylinder-type is mounted on one side (preferably the underside) of a frame plate secured to the vehicle frame. On the other side of the frame plate (preferably the upper side) is disposed the gear box in which the primary reduction of gear is effected by means of a worm on the engine shaft (which projects into the gear box) and a worm wheel mounted upon a countershaft or a pair of bevel gears or equivalent means may be used. The frame plate may be detachably secured to the vehicle frame so that by detaching the frame plate the power unit and gear box may be removed bodily from the vehicle as a whole. Provision is also made for a change speed gear and clutch in the gear box, suitable gear wheels preferably of the spur type being mounted on the countershaft and upon a lay shaft. These gears are adapted to be thrown into or out of mesh or to be engaged and disengaged by suitable dog or like clutches so that the countershaft may be driven at varying speeds through their agency. The clutch which is preferably of the multiple plate type, is also mounted upon the countershaft and is arranged to engage the driving and driven members which are normally independent of each other.

In a modification the clutch may be situated on the engine shaft so as to engage the worm or equivalent part therewith. The final drive from the countershaft to the road wheel or wheels is by belt, chain or propeller shaft.

In order that my invention may be more readily understood, reference is had to the accompanying drawings in which:—

Figure 1 is a side elevation showing the arrangement of the motor, gear box and transmission as designed more particularly for use on a motor-cycle. Figs. 2 and 3 are vertical and horizontal sections of the gear box. Fig. 4 is a diagrammatic illustration of the arrangement of the three speed gear and Fig. 5 illustrates the arrangement of gate for the change speed-lever.

Referring to the Fig. 1, A is the frame plate adapted to be removably secured to the motor-cycle or other vehicle by means of suitable bolts engaging in the lugs $a$, $a$. On the underside of the frame plate A is secured the twin cylinder double opposed engine B by means of the studs or bolts $b$ which engage flanges or lugs on the crank case $b^1$, the engine being disposed in a horizontal plane so that the revolving parts rotate about a vertical axis. An outside flywheel $b^2$ is arranged to rotate beneath the engine as shown. On the upper surface of this frame plate A is mounted the gear box C by means of studs or bolts $c$ engaging flanges or lugs $c^1$. The engine crank shaft projects into the gear box and drives a counter shaft journaled therein, at a reduced speed through the agency of a worm and wheel, pair of bevel gears or equivalent means.

Referring to Figs. 2 and 3, which illustrate an arrangement of gear box employing a worm and wheel reducing gear, the engine shaft $b^3$ projects into the gear box casing $c^1$ and is journaled at its upper end in a bearing $c^2$ in the said casing. On the engine shaft $b^3$ is a worm D which gears with a worm wheel mounted loosely upon the counter shaft E journaled at each end in ball bearings $e$, $e$, provided in the case $c^1$, a removable cover $c^3$ being provided at one end to enable the countershaft E and its attachments to be removed therethrough. Upon the countershaft on one side of the worm wheel $D^1$ is provided a two speed gear comprising a pinion F and gear wheel $F^1$, the former made in one with or secured to the worm wheel $D^1$ while the latter is mounted loosely upon the countershaft E. A gear wheel G and pinion $G^1$ gear respectively with the pinion F and gear wheel $F^1$ and are mounted on a lay shaft and connected so as to rotate together. Between the pinion F and gear F¹ is provided a sliding dog-clutch H adapted to be operated by the rod $h$ to lock either the pinion F or gear F¹ to the countershaft E. If the pinion F be locked to the counter-shaft the worm wheel is also locked thereto and the countershaft is driven direct or on high gear, but if the gear F¹ be locked the pinion F drives the wheel F¹ through the gear G and pinion G¹ on the lay shaft thus driving the countershaft E indirectly or on the low gear. On the other side of the worm wheel is arranged the multiple plate clutch comprising inner members J and J¹ keyed to the countershaft and adapted to be pressed together by means of the spring $j$ to cause the plates K¹ keyed to the members J, J¹ to frictionally engage the plates K keyed to the drum L whose boss $l$ passes through the bearing $e$ and has the belt pulley M mounted thereon. The clutch is operated by a duplicate hand and foot control in which a loose bush N journaled in the pulley lock nut $m$ has the operating pin O screwed into it by means of a quick pitch thread. The loose bush N and the operating pin O have levers $n$ and $o$ respectively, one of which is connected to the foot and the other to the hand control so that operation of either control causes the operating pin O to press the member J back against the action of the spring $j$, thereby disengaging the clutch.
Referring to Fig. 4 the modified change speed gear comprises an intermediate pair of gear wheels F² and G² on the countershaft and layshaft respectively. The intermediate gear wheel F² is mounted upon the sliding dog clutch, so that it may be slid into engagement with the wheel G² to provide an intermediate speed when neither of the wheels F or F¹ are locked to the countershaft E by the dog clutch.
Fig. 5 shows the gate in which the change speed lever works. This comprises a slot P of approximately the shape of a figure 5 the normal positions of rest of the lever being shown at Q¹, Q², Q³, and Q⁴, it being necessary to deflect the lever to one side in order to move it from one position to another.

Figs. 4 and 5 show the gear and the gear lever in the intermediate positions, that is the gears are in the second or intermediate speed in which the shaft E is driven indirectly from the pinion F through the gears G, G² and F². If the gear lever be moved to the position Q¹ in the gate, the gear F² will be slid to the right so that the gears F² and G² disengage and the dog clutches on F and F² engage, thus locking F to the shaft E, to drive direct on top speed. If however instead of being moved to the position Q¹, the lever be moved to the position Q³, the gears F² and G² will be disengaged and the dog clutch on the other side of F will engage the dog clutch on F¹ thus locking the latter to the shaft E. This will give the lowest speed, the drive being indirect through the pinion F, gears G, G¹ and F¹ to the shaft E. If now the gear lever be moved up the short arm to the position Q⁴ the dog clutches on F¹ and F² will be disengaged, but the gear F² will not be moved sufficiently to engage the wheel G. This is the neutral position in which none of the gears are in driving connection with the shaft E and in which the lever is placed when the vehicle is standing. This neutral position Q⁴ is so situated as to necessitate a progressive change through the low and intermediate gears to the high gear by placing the gear lever in the positions Q³, Q² and Q¹ in rotation.

What I claim as my invention and desire to secure by Letters Patent is:—

1. In a motorcycle, tricar, cyclecar or like motor vehicle, an engine and gear box secured on opposite sides of a horizontal frame plate adapted to form part of the vehicle frame, so that the engine shaft rotates about a vertical axis and projects through the frame plate into the gear box, a horizontal countershaft in the gear box, driven from the continuation of the vertical crank shaft and means for transmitting the power from the countershaft to the driving wheel or wheels.

2. In a motor cycle, tricar, cycle car or like motor vehicle, a horizontal frame plate adapted to be detachably secured in the vehicle frame, a horizontal engine having a vertically disposed crank shaft, on one side of the frame plate and a gear box on the other side thereof and means for transmitting the power from the gear box to the driving wheel or wheels.

3. In a motorcycle, tricar, cycle car or like motor vehicle, a horizontal detachable frame plate, a horizontally disposed engine secured to the underside thereof and a gear box secured to the upper side thereof, a continuation of the vertical engine shaft projecting into the gear box, a horizontal countershaft journaled in the gear box, gearing on the engine shaft and the countershaft to transmit the power to the latter, a change speed gear mounted on one end of the countershaft, and a friction clutch on the other end adapted to engage the countershaft with the means for transmitting the power to the driving wheel or wheels.

4. In a motor cycle, tricar, cycle car or like motor vehicle, a horizontal detachable frame plate, a double opposed twin-cylinder internal combustion engine secured to the underside thereof and a gear box secured to the upper side thereof, a continuation of the vertical engine shaft projecting into the gear-box, a horizontal countershaft journaled in the gear box and driven from the engine shaft by gearing, a two speed gear, comprising a pair of gear wheels mounted on the countershaft, one being loose and the other fixed to the driven member of the gearing between the engine shaft and countershaft, two interconnected wheels on the countershaft and a sliding dog clutch to engage one of the wheels to the countershaft and a multiple plate clutch to frictionally engage with the countershaft the driven member of the means for transmitting the drive to the vehicle wheel or wheels.

5. In a motor-cycle, tricar, cycle car or like motor vehicle, a horizontal detachable frame plate, a double opposed twin cylinder internal combustion engine on the under side and a gear box on the upper side thereof, a continuation of the vertical engine shaft projecting into the gear box, a worm on the engine shaft, a horizontal countershaft journaled in the gear box and a worm wheel on the countershaft and driven by the worm on the engine shaft, a gear wheel on the countershaft fixed to the worm wheel and another loose upon the countershaft, two interconnected gear wheels on a lay-shaft gearing respectively with the two wheels on the countershaft, a sliding clutch adapted to lock either of the loose wheels on the countershaft thereto, and a friction clutch on the countershaft adapted to engage the driving member of the means for transmitting the final drive to the vehicle wheel or wheels, therewith.

6. In a motor cycle, tricar, cycle car or like motor vehicle, a horizontal detachable frame plate, a double opposed twin cylinder internal combustion engine on the under side and a gear box on the upper side thereof, a continuation of the vertical engine shaft projecting into the gear box, a worm on the engine shaft, a horizontal countershaft journaled in the gear box and a worm wheel on the countershaft and driven by the worm on the engine shaft, three gear wheels of progressive diameters on the countershaft, the smallest being fixed to the worm wheel, the largest being free on the countershaft and the other being feathered upon the countershaft, three corresponding connected gear wheels upon a lay shaft, the two outer of which gear with the two outer gear wheels upon the countershaft, dog clutches on each side of the sliding intermediate wheel on the countershaft and a gate in which the control lever of this three speed gear works, shaped substantially like a figure 5 having sharp angles instead of rounded curves.

In witness whereof I have hereunto set my hand in the presence of two witnesses.

GEORGE F. RAYNER.

Witnesses:
FRANK W. PATTISON,
COLIN D. MCCREDDIE.

Copies of this patent may be obtained for five cents each, by addressing the "Commissioner of Patents, Washington, D. C."